April 3, 1962
C. W. HIBSCHER
3,027,956
WEIGHT LIFTER FOR WEIGHING SCALES
Filed May 7, 1958
4 Sheets-Sheet 1
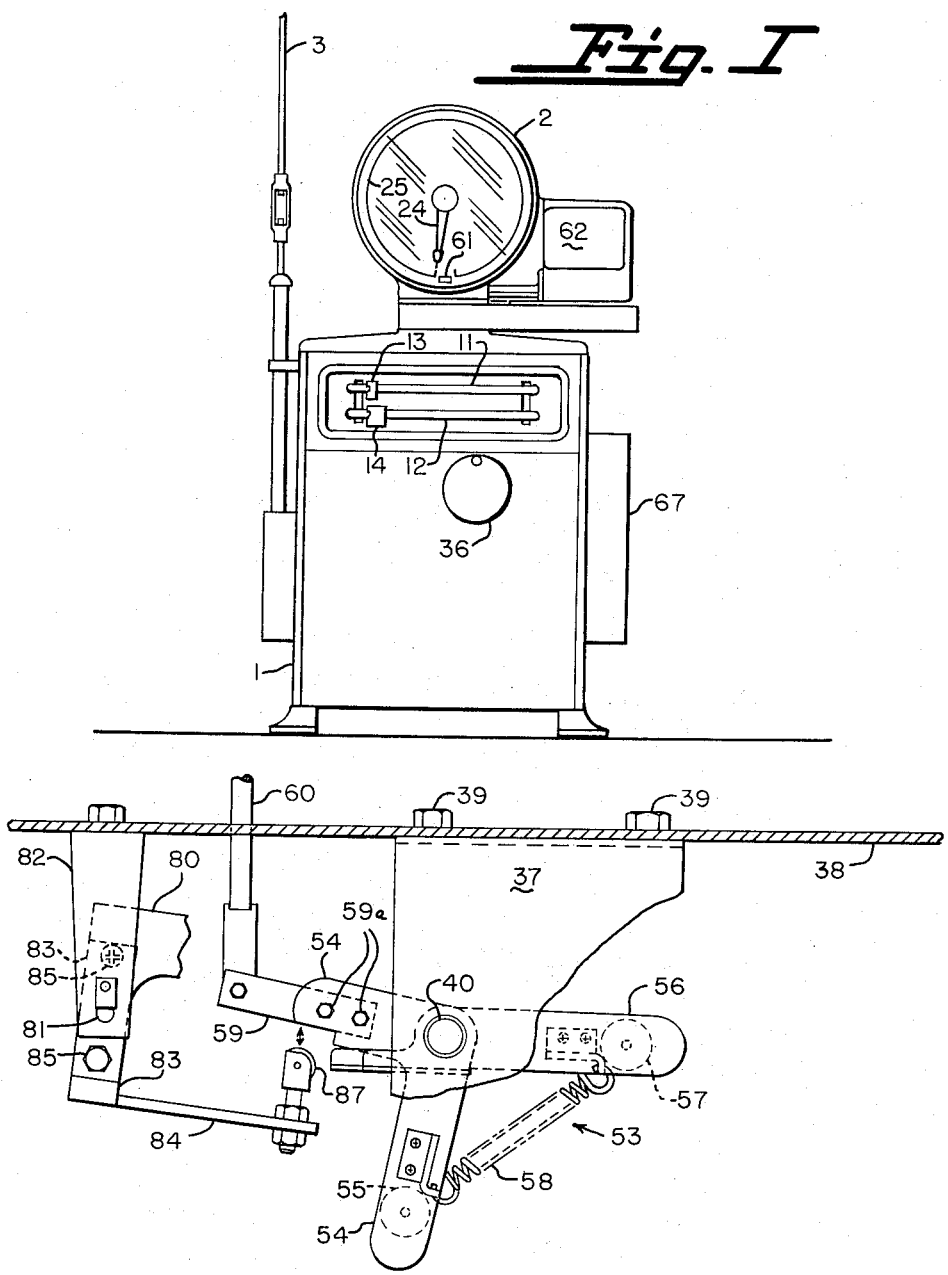
INVENTOR.
CARL W HIBSCHER
BY
Marshall, Marshall & Yeasting
ATTORNEYS

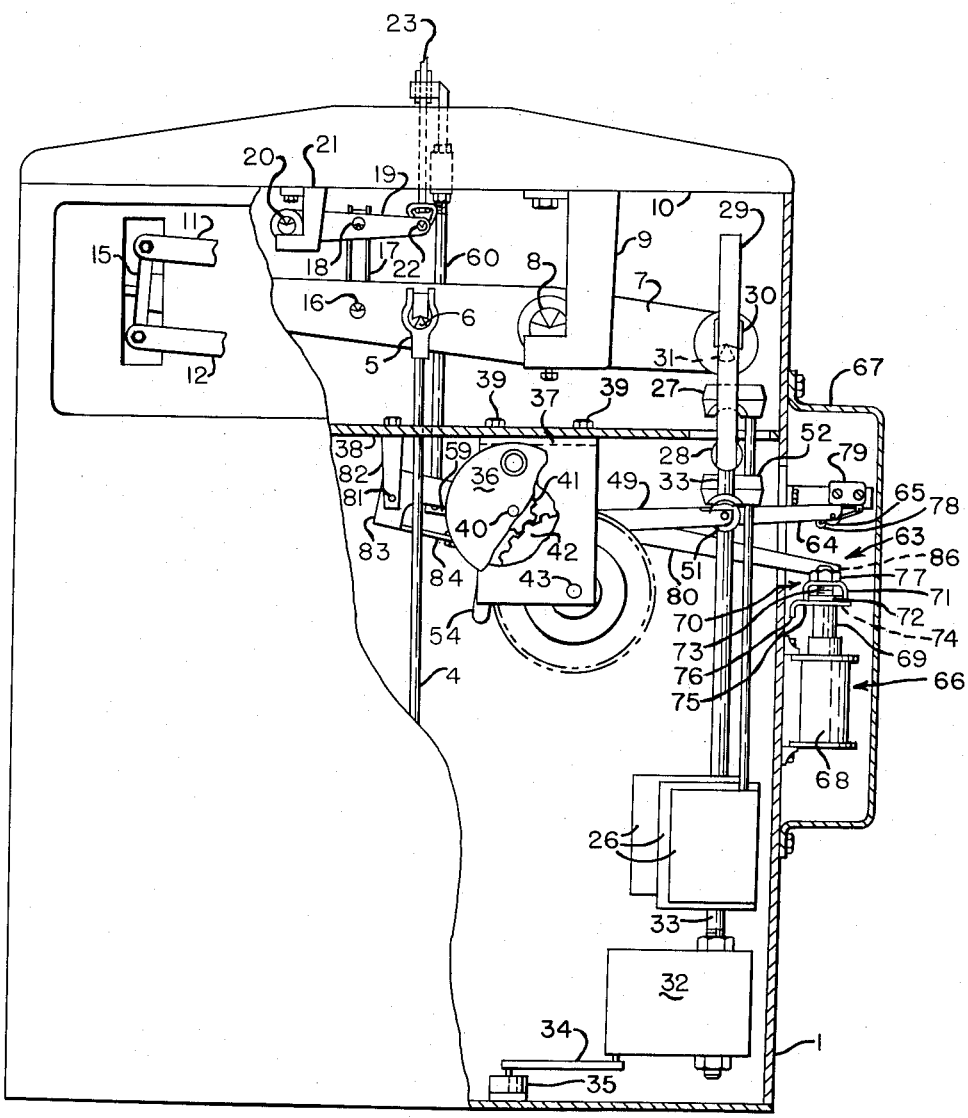
Fig. II
INVENTOR.
CARL W. HIBSCHER
BY
Marshall, Marshall & Yeasting
ATTORNEYS April 3, 1962 C. W. HIBSCHER 3,027,956
WEIGHT LIFTER FOR WEIGHING SCALES
Filed May 7, 1958 4 Sheets-Sheet 3
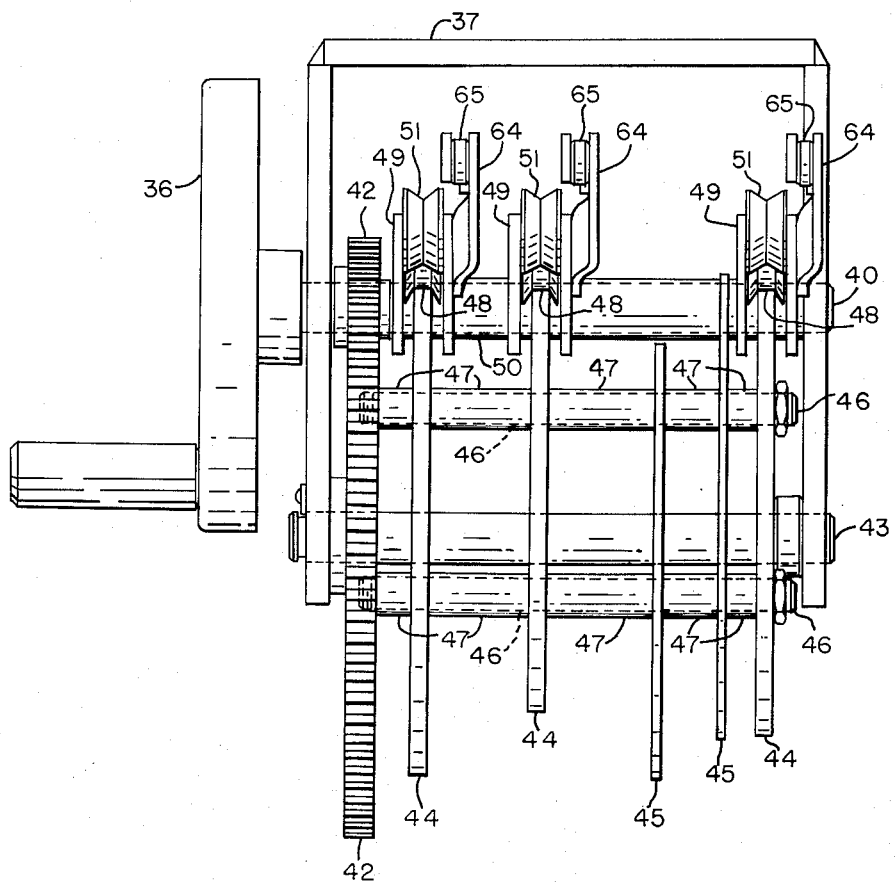
Fig. III
INVENTOR.
CARL W. HIBSCHER
BY
Marshall, Marshall & Yeasting
ATTORNEYS

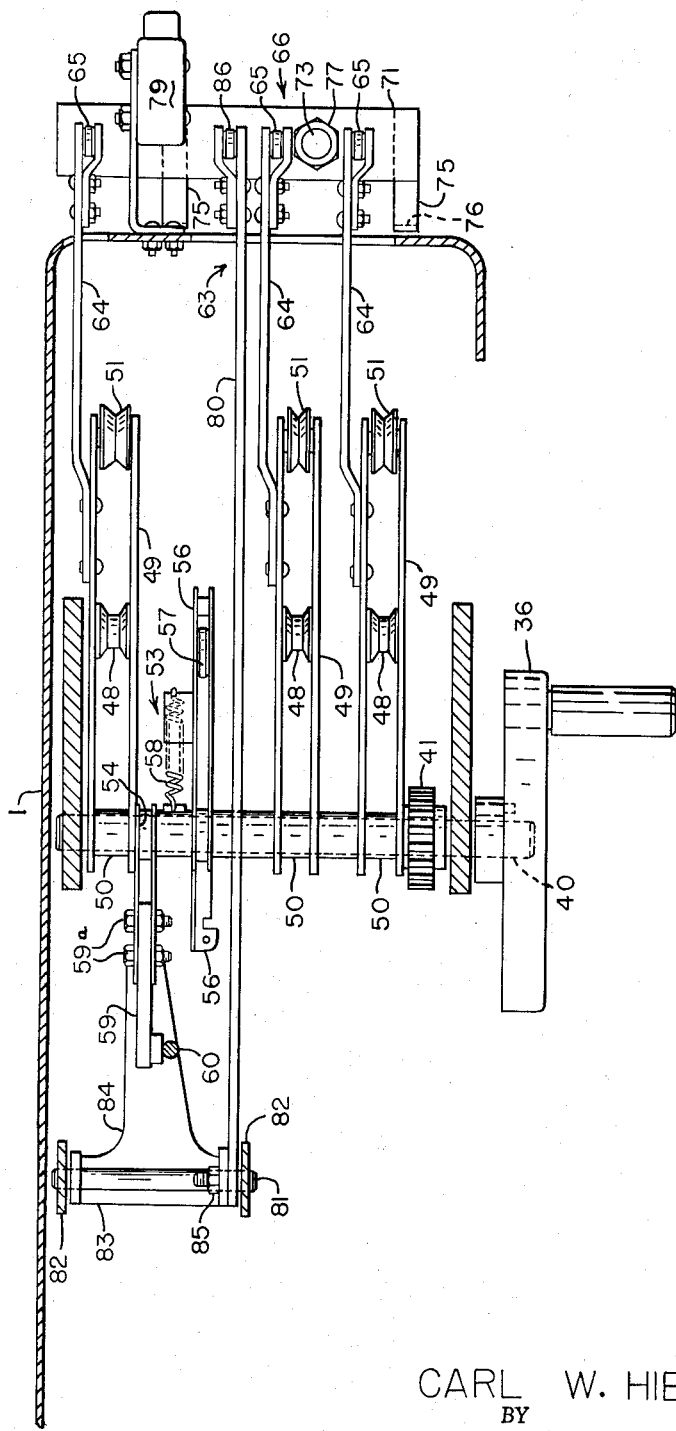

United States Patent Office 3,027,956
Patented Apr. 3, 1962

3,027,956
WEIGHT LIFTER FOR WEIGHING SCALES
Carl W. Hibscher, Toledo, Ohio, assignor to Toledo Scale Corporation, Toledo, Ohio, a corporation of Ohio
Filed May 7, 1958, Ser. No. 733,747
11 Claims. (Cl. 177—203)

This invention relates generally to weighing scales, and more particularly to lifters for weights that are placed on and removed from weighing scale mechanisms.

Many weighing scales are constructed which incorporate additional so-called "unit weights" for increasing the load counterbalancing capacity of the scale without decreasing the sensitivity of indication given by the main scale indicator. This is usually accomplished by means of manually positionable weights which are placed on the weighing scale mechanism, one at a time, and each of which increases the capacity of the scale by some fixed amount, e.g., 500 or 1000 pounds. In scales so equipped, the unit weights may counterbalance as much as nine-tenths of the total weighing capacity of the scale, the remaining portion being counterbalanced by automatic load counterbalancing mechanism and indicated by the regular scale indicator attached thereto. An auxiliary chart or charts operated from the unit weight lifting mechanism provide indication of the load counterbalanced by the unit weights.

In weighing scales having a manipulative unit weight system, it has been customary to make the counterbalancing capacity of each unit weight exactly the same as the capacity of the automatic load counterbalancing means. Manipulation of the unit weight lifting mechanism places one or more unit weights into cooperative relation with the automatc load counterbalancing mechanism when a load on the platform exceeds the automatic counterbalancing capacity. The unit weight lifting mechanism also drives unit weight or auxiliary load printing mechansm and unit weight or auxiliary load visual indicating mechanism.

Heretofore, in indicating the gross weight and tare weight of large loads it often has been necessary to crank the unit weights on for gross weight and off for tare for every load. This procedure is particularly unsatisfactory in weighing successively very large loads such as 1,000,-000 pounds of grain that may be divided, for example, into twenty-five 40,000 pound parts and that must be loaded, for example, in a matter of minutes into a ship. In weighing such a load using the prior unit weight mechanism incorporated in a scale having a capacity without unit weights of 10,000 pounds, first it is necessary to crank on enough unit weights to increase the load counterbalancing capacity of the scale to 40,000 pounds and print the gross weight of about 40,000 pounds after filling the weigh hopper, and then it is necessary to crank off all of such unit weights and print the tare weight after the discharge cycle. The tare weight includes the weight of grain that becomes stuck in the hopper. Such cranking on and off of the unit weights twenty-five times in weighing the 1,000,000 pounds of grain slows down the process and soon wears out the prior unit weight operating mechanism when the scale is used day after day in weighing successively very large loads.

It is, accordingly, the principal object of this invention to provide, in a weighing scale, improved means for placing weights on and removing weights from the weighing scale mechanism.

Another object of the invention is to provide in combination with the improved means for placing weights on and removing weights from the weighing scale mechanism means for indicating the weight of load counterbalanced by such weights.

More specific objects and advantages are apparent from the following description of a specific embodiment of the invention.

According to the invention, a lifter is provided for placing weights on and removing weights from weighing scale mechanism. The lifter is especially suitable for use in conjunction with the weighing scale and its unit weight lifting mechanism that is illustrated and described in U.S. Patent No. 2,724,585 issued to Robert O. Bradley and Clayton H. Maurice, Jr. on November 22, 1955. The unit weights in such a scale incorporating the lifter of the invention are cranked on to a selected number of weights in the usual way only once, the ordinary unit weight operating handle being used in effect as a selector. Once the selected unit weights are in place, they are lifted out of their operative positions, for tare weight indicating, by the lifter which also correctly positions conventional unit weight indicating mechanism. The lifter picks up only the unit weights which have been selected by the unit weight operating handle for the tare weight indicating and/or printing operation, and lowers them back in place for the gross weight indicating and/or printing operation. The weight operating handle is used only when changing from one number of unit weights to another as a means for selecting the number of weights to be cyclically lifted from the weighing mechanism and then replaced by the lifter.

The invention may be more readily understood from the following detailed description of a specific embodiment in which description reference is made to the accompanying drawings:

In the drawings:

FIG. I is a perspective view of a unit weight cabinet and of a dial housing of a weighing scale embodying the weight lifter of the invention;

FIG. II is an enlarged front elevational view of the unit weight cabinet, part of the cabinet being broken away and part being shown in vertical section, illustrating prior unit weight operating mechanism together with the weight lifter of the invention;

FIG. III is an enlarged side elevational view of the unit weight operating mechanism;

FIG. IV is a plan view of the unit weight operating mechanism and of the weight lifter, supporting structure therefore being shown in horizontal section;

FIG. V is an enlarged front elevational view of mechanism, which is shown in part in FIG. II, for driving auxiliary load printing and/or auxiliary load visual indicating devices.

These specific drawings and the accompanying description are intended merely to illustrate the invention but not to limit its scope.

A weighing scale embodying the invention includes a cabinet 1 surmounted by a dial housing 2. Overhead load receiving mechanism (not shown) is provided and is operatively connected to a steelyard 3 that is operatively connected in turn to a rod 4 suspended by means of a stirrup 5 from laterally extending pivots 6 in a tare beam lever 7. The load moment is transmitted to the tare beam lever 7 through the rod 4, the lever 7 being rockably mounted, by fulcrum pivots 8, upon a fulcrum stand 9 hung from a ceiling 10 in the interior of the cabinet 1. The tare beam lever 7 carries tare beams 11 and 12, with their poises 13 and 14, bolted to projecting arms 15 which beams and cooperating poises serve to offset tare weights.

Load forces to be counterbalanced are transmitted from the tare beam lever 7 through a power pivot 16 and connecting linkage 17 to a load pivot 18 of a second lever 19, which, by means of fulcrum pivots 20, is rockably mounted upon a fulcrum bracket 21 hung from the ceiling 10 of the cabinet 1. The second lever 19 has a power pivot 22 engaging a bearing at the lower end of a rod 23 that extends upwardly into the dial housing and that is connected to ordinary automatic load counterbalancing mechanism (not shown), such as springs or pendulums, enclosed within the dial housing 2. An indicator 24 cooperates with a series of indicia marked on the face of a chart 25 to indicate the weights of loads that are counterbalanced by the automatic load counterbalancing mechanism.

Auxiliary load counterbalancing mechanism also is provided. Basically such mechanism is more or less like that shown and described in the hereinbefore referred to U.S. Patent No. 2,724,585, the weight lifter of the invention being an addition thereto. The auxiliary load counterbalancing mechanism includes three individual unit weights 26 having first hooked portions 27 which may be successively and individually hooked over a hanger bar 28 secured to the lower ends of plates 29 whose upper ends are provided with V-bearings 30 which are supported upon laterally extending pivots 31 in the tare beam lever 7 on the opposite side of the fulcrum point of the lever 7 from the connection between the rod 4 and the lever. For counterbalancing the dead weight of the load receiving apparatus and the lever system, not counterbalanced by the load counterbalancing mechanism when in initial position, a hollow chamber 32, suspended by a rod 33 attached to the hanger bar 28, is provided for the reception of lead. Swinging motion, or oscillation of the chamber 32 about its suspension point on the hanger bar 28, is prevented by a check link 34 whose ends pivotally engage the chamber 32 and a fulcrum stand 35 which is erected from the floor of the cabinet 1.

Unit weight lifting mechanism is provided so that the unit weights 26 can be manually applied to or taken from the hanger bar 28 by manipulation of a selector handle 36 exteriorly located on the cabinet. Each time that the handle 36 is turned clockwise 180 degrees, the capacity of the scale is increased by a fixed amount equal to the capacity of the chart 25. If the chart 25, for example, has a capacity of 10,000 pounds the unit weights are chosen of weights such that when they are added to the lever 7 each one will increase the capacity of the scale by 10,000 pounds. Hence, the total capacity of such a scale is 40,000 pounds. Each time that the handle 36 is turned counterclockwise 180 degrees the capacity of the scale is decreased by the fixed amount.

The unit weight lifting mechanism is hung as a unit assembly by means of an inverted U-shaped bracket 37 attached to a shelf 38 within the cabinet. Removal of nuts 39 allows the bracket 37 carrying the unit weight lifting mechanism to be taken out of the cabinet. The unit weight lifting mechanism includes the handle 36 which is fixed to a shaft 40 journaled in legs of the bracket 37 and a pinion 41 also fixed to the shaft 40 which pinion is meshed with a gear 42 fixed on a shaft 43 journaled in the legs of the bracket 37. When the handle 36 is turned and the pinion 41 drives the gear 42, lifting cams 44 and cams for driving auxiliary load printing and/or auxiliary load visual indicating mechanism or flash drive cams 45 rigidly attached to the gear 42 by means of studs 46 threaded into the gear 42 turn in response. The cams 44 and 45 are separated from the gear 42 and from each other by separators 47, the shaft 43 to which the gear 42 is attached passing through a hole cut in each cam. Lifting cams and flash drive cams similar to cams 44 and 45 are shown in more detail in the hereinbefore referred to U.S. Patent No. 2,724,585.

When the lifting cams 44 are turned, cam following rollers 48, journaled in lifting arms 49, drive the arms 49 about the axis of the shaft 40 on which the arms are pivoted. Spacers 50 on the shaft 40 separate the arms 49 from each other and from the other members carried by the shaft. The lifting arms 49 carry lifting rollers 51 at their free ends which cooperate with second hooked portions 52 of the unit weights 26 to move the first hooked portions 27 of the unit weights from or onto the hanger bar 28.

As the lifting cams 44 are turned, the flash drive cams 45 also are turned to drive a follower 53 rotatably mounted on the shaft 40. The follower 53 includes an L-shaped bell crank 54 formed of two identically shaped spaced pieces pivoted side by side to the shaft 40, the bell crank 54 carrying a roller 55 following one of the flash drive cams 45. An arm 56, also formed of two identically shaped spaced pieces, is pivoted adjacent the bell crank 54 on the shaft 40 and carries a roller 57 that follows the other one of the flash drive cams 45, the bell crank 54 being separated from the arm 56 by one of the spacers 50 on the shaft 40. The rollers 55 and 57 are constantly urged toward each other and toward the cams 45 by a return spring 58 that interconnects the bell crank 54 and the arm 56. A bar 59 is sandwiched between the spaced pieces forming the bell crank 54, is secured thereto by a pair of bolts and nuts 59a and extends beyond the bell crank. This construction provides a fail safe, positive drive for the bar 59, i.e., no return means independent of the flash drive cams 45, such as a spring return, is used. The flash drive cams are shaped and positioned to positively drive the left hand end of the bar 59 as viewed in FIGS. II and V downward as unit weights are placed by the unit weight lifting mechanism onto the hanger bar 28 and upward as unit weights are removed from the hanger bar. Hence, the vertical position of such end of the bar 59 is indicative of the amount of load offset by the unit weights. For the purpose of indicating and printing the amount of load on the scale offset by unit weights, the bar 59 is pivotally connected to a drive rod 60 extending upwardly within the cabinet. The rod 60 is operatively connected to a unit weight chart plate that extends to a position within the field of view of a magnifying lens 61 (FIG. I) to give a visual indication of the amount of load offset by unit weights. Also, the rod is operatively connected to printing members that are within a printer case 62 to set up the printing members for making a print of the amount of load offset by unit weights. Neither the unit weight chart plate nor the printing members are shown for the sake of simplicity, the indication of the amount of load offset by unit weights, for the purpose of understanding the invention, being given by the vertical position of the end of the bar 59.

Heretofore, in indicating the gross weight and tare weight of large loads it often has been necessary to crank the unit weights on for gross weight and off for tare for every load. This procedure is particularly unsatisfactory in weighing successively very large loads such as 1,000,000 pounds of grain that may be divided, for example, into twenty-five 40,000 pound parts and that must be loaded, for example, in a matter of minutes into a ship. For the purpose of exemplification, the scale is given a normal capacity of 10,000 pounds and a capacity with the three unit weights in operation of 40,000 pounds. In weighing such a load using the unit weight lifting mechanism so far described, first it is necessary to crank on the unit weights to increase the load counterbalancing capacity of the scale to 40,000 pounds and print the gross weight of about 40,000 pounds after filling the weight hopper, and then it is necessary to crank off all of such unit weights and print the tare weight after the discharge cycle. The tare weight includes the weight of grain that becomes stuck in the hopper. Such cranking on and off of the unit weights twenty-five times in weighing the 1,000,000 pounds of grain slows down the process and soon wears out the unit weight operating mechanism when the scale is used day after day in weighing successively very large loads.

When the weight lifting mechanism 63 of the invention is incorporated in the scale, however, the function of the handle 36 is changed. The unit weights 26 in a scale incorporating the lifting mechanism 63 are cranked on to a selected number of weights in the usual way only once, the ordinary unit weight operating handle 36 being used in effect as a selector. Once the selected unit weights are in place, they are lifted out of their operative positions, for tare weight indicating, by the lifting mechanism 63 which also correctly positions unit weight indicating mechanism. The lifting mechanism 63 picks up only those unit weights which have been selected by the handle 36 for the tare weight indicating and/or printing cycle, and lowers them back in place for the gross weight indicating and/or printing cycle. The handle 36 is used only when changing from one number of unit weights to another as a means for selecting the number of weights to be cyclically lifted from the weighing mechanism and then replaced by the lifting mechanism 63.

The lifting mechanism 63 includes auxiliary arms 64 that are attached one to each of the three lifting arms 49 as extensions thereof and that carry rollers 65 at their free ends and a lifter 66 that is positioned directly below the rollers 65 of the auxiliary arms 64. The lifter 66 is attached to the outer surface of a wall of the cabinet 1 and is housed within a small auxiliary cabinet 67 that also is secured to the wall, the arms 64 extending from cabinet 1 and into cabinet 67 through an opening in cabinet 1.

The lifter 66 includes an ordinary air-operated cylinder 68, a vertical rod 69 secured to the piston of the cylinder, an arm member 70 on the top of the vertical rod 69, and a yoke 71 on top of the arm member 70. The arm member 70 is formed of three pieces, a plate 72 having an opening which loosely receives a necked down threaded end 73 of the rod 69 and which bears upon a shoulder 74 of such necked down threaded end 73 and a spaced pair of arms 75 that are welded to the plate 72 and that have down-turned fingers 76 closely adjacent the wall of the cabinet 1 which function as means for limiting any tendency of the arm member 70 to twist as it is moved up and down. The yoke 71 also has an opening which loosely receives the threaded end 73 of the rod 69 and is carried by the arms 75 as shown in FIG. II, a nut 77 on the threaded end 73 of the rod 69 holding the yoke 71 and the arm member 70 on the rod.

All of the unit weights 26 are shown in their inoperative positions in FIG. II. If it is desired to increase the capacity of the scale, for example, to its maximum capacity, the handle 36 is turned clockwise until the lifting rollers 51 lower the hooked portions 27 of the three unit weights into operative position on the hanger bar 28. The handle 36 is not used again until it is desired to change from the use of three unit weights to a lesser number. This lowers the rollers 65, operatively connected to the lifting rollers 51, until they rest or nearly rest upon the yoke 71 of the lifter 66. After the gross weight indicating and/or printing cycle, the lifter 66 is caused, by admittance of air to cylinder 68, to move upwardly until the yoke 71 contacts a switch arm 78 of a micro-switch 79, the yoke 71 picking up the rollers 65 on the way up. Hence, auxiliary arms 64 which carry the rollers 65 are pivoted counterclockwise about the axis of the shaft 40 and the lifting rollers 51, operatively connected to the arms 64, pick up all of the unit weights and return them to their inoperative positions shown in FIG. II. Thus, the lifting rollers 51 selectively either are driven by the cams 44 that are turned by the handle 36 or by the lifter 66. The contact of the yoke 71 with the switch arm 74 operates the switch 79 producing a signal indicating that all of the unit weights are off and that, after the load discharge or removal cycle, the tare weight printing operation can be started. After the tare weight indicating and/or printing cycle, the lifter 66 is caused to move downwardly, by release of air from cylinder 68, permitting the arms 64 to pivot clockwise about the axis of the shaft 40 under their own weight until the cam following rollers 48 return to their normal positions on the cams 44. The lifter 66 picks up only that one or those ones of the unit weights which has or have been selected by the handle 36, the weights being cyclically lifted from the weighing mechanism for tare weighing and returned to the weighing mechanism for gross weighing. The scale, by simply not using the lifter 66, can be used in the usual way as a unit weight scale by lifting the unit weights on and off of the weighing mechanism by means of the handle 36 and the apparatus operated thereby.

As the unit weight lifting cams 44 are turned by means of the handle 36 to lift the unit weights off of the weighing mechanism or to place then on the weighing mechanism, the flash drive cams 45 also are turned to drive the follower 53 as hereinbefore described, the vertical position of the end of the bar 59 secured to the follower indicating the amount of load offset by the unit weights. Appropriate lettering (not shown), adjacent the lens 61 (FIG. I), e.g., ADD-lbs., serves to call attention to the fact that the amount represented by the indicia within the field of view of the lens must be added to the amount indicated by the indicator 24 on the chart 25. However, when the unit weights are lifted from the weighing mechanism by the lifter 66, the flash drive cams 45 remain stationary so that other driving means are necessary for positioning the end of the bar 59 vertically so that it continues to give a true indication of the amount of load offset by unit weights.

The lifting mechanism 63 includes a long unit weight indication drive arm 80 which is pivoted on a pin 81 that is carried with its axis horizontal by an inverted U-shaped bracket 82 which is hung from the shelf 38 of the cabinet 1. Also pivoted on the pin 81 is a U-shaped bracket 83 that has a tongue 84 and that is secured to the drive arm 80 to move as one therewith by fasteners 85. The end of the drive arm 80 remote from the pin 81 carries a roller 86 which is always in contact by means of gravity with the yoke 71. Thus, when the yoke 71 moves upwardly and lifts unit weights from the weighing mechanism, the roller 86 also is lifted upwardly to pivot the drive arm 80 counterclockwise as viewed in FIG. II about the axis of the pin 81, and, when the yoke 71 moves downwardly and lowers the unit weights onto the weighing mechanism, the roller 86 follows the yoke 71 to pivot the drive arm 80 clockwise about the axis of the pin 81. The tongue 84, which moves as one with the drive arm 80, extends to a position directly underneath the bar 59.

When the unit weights 26 are in their inoperative position as shown in FIG. II, with the lifter 66 in its lowered position, the tongue 84 is so positioned that a roller 87 (FIG. V) carried on the end of the tongue remote from the pin 81 is spaced from the bottom of the bar 59. In this position of the drive arm 80 and the tongue 84, the follower 53 is free to follow the flash drive cams 45 to vertically position the end of the bar 59, secured to the follower, to indicate the amount of load offset by unit weights. However, when the lifter 66 is operated to remove unit weights from the weighing mechanism, the counterclockwise pivoting of the drive arm 80 about the axis of the pin 81 drives the roller 87 on the tongue 84, as indicated by the double ended arrow in FIG. V, against the bottom of the bar 59. This pivots the bell crank 54, secured to the bar 59, clockwise as viewed in FIG. V about the axis of the shaft 40 in opposition to the return spring 58, moving flash cam following roller 55 away from its cam 45, and drives rod 60 upwardly to a position of zero indication. Return of the lifter 66 to its lowered position returns the tongue 84 and its roller 87 to their positions shown in FIG. V. In this condition, the return spring 58 urges the bell crank 54 counterclockwise about the axis of the shaft 40 to return the roller 55 against its flash cam 45. Hence, the vertical position of the end of the bar 59 indicates the amount of load offset by units weights both when the units weights are moved by means of the handle 36 and the apparatus operated thereby, and when the unit weights are moved by means of the lifter 66 and the apparatus operated thereby and to return the end of the bar 59 to a vertical position that indicates the amount of load offset by unit weights according to the position of the flash drive cams 45.

The embodiment of the invention that has been disclosed may be modified to meet various requirements.

Having described the invention, I claim:

1. In a weighing scale, in combination, mechanism including at least one unit weight for offsetting load, first means for positioning the unit weight to selectively increase the load offsetting capacity of the mechanism from a first capacity to a second capacity, and second means independent of the first means for cyclically repositioning the unit weight to return the mechanism to the first capacity for tare weighing and positioning the unit weight to return the mechanism to the second capacity for gross weighing.

2. In a weighing scale, in combination, mechanism including at least one unit weight for offsetting load, first means for positioning the unit weight to selectively increase the load offsetting capacity of the mechanism from a first capacity to a second capacity, second means for cyclically repositioning the unit weight to return the mechanism to the first capacity for tare weighing and positioning the unit weight to return the mechanism to the second capacity for gross weighing, an indicating device, and means for operatively connecting the indicating device either to the first means during the time that the first means is operated or to the second means when the second means is operated, whereby the device indicates the amount of load offset by the unit weight.

3. In a weighing scale, in combination, a pivotally mounted lever, a plurality of weights, selecting means for operatively connecting a selected number of the weights to the lever for offsetting load, and a lifter independent of the selecting means for cyclically removing the selected weights substantially simultaneously from said lever for a first weighing operation and then returning the selected weights substantially simultaneously to said lever for a second weighing operation.

4. In a weighing scale, in combination, mechanism including a plurality of unit weights for offsetting load, selecting means for positioning a selected number of the unit weights to selectively increase the load offsetting capacity of the mechanism from a first capacity to an increased capacity, and additional means independent of the selecting means for cyclically repositioning said selected number of unit weights to return the mechanism to the first capacity for tare weighing and then positioning said selected number of unit weights to return the mechanism to the second capacity for gross weighing.

5. In a weighing scale, in combination, mechanism including a plurality of unit weights for offsetting load, selecting means for positioning a selected number of the unit weights to selectively increase the load offsetting capacity of the mechanism from a first capacity to an increased capacity, additional means for cyclically repositioning said selected number of unit weights to return the mechanism to the first capacity for tare weighing and then positioning said selected number of unit weights to return the mechanism to the second capacity for gross weighing, an indicating device, and means for operatively connecting the indicating device either to the selecting means during the time that the selecting means is operated or to the additional means when the additional means is operated, whereby the device indicates the amount of load offset by unit weights.

6. In a weighing scale, in combination, a pivotally mounted lever, a plurality of weights, selecting means for operatively connecting a selected number of the weights to the lever for offsetting load, a lifter independent of the selecting means for cyclically removing the selected weights substantially simultaneously from said lever for a first weighing operation and then returning the selected weights substantially simultaneously to said lever for a second weighing operation, and means for indicating the amount of load offset by weights.

7. In a weighing scale, in combination, mechanism including a pivotally mounted lever and a plurality of unit weights for offsetting load, selecting means for hanging a selected number of the unit weights on the lever to selectively increase the load offsetting capacity of the mechanism from a first capacity to an increased capacity, and lifting means for lifting substantially simultaneously said selected number of unit weights from the lever to return the mechanism to the first capacity for a first weighing cycle and for then returning substantially simultaneously said selected number of unit weights to the lever to return the mechanism to the second capacity for a second weighing cycle.

8. In a weighing scale, in combination, mechanism including a pivotally mounted lever and a plurality of unit weights for offsetting load, selecting means for hanging a selected number of the unit weights on the lever to selectively increase the load offsetting capacity of the mechanism from a first capacity to an increased capacity, lifting means for lifting substantially simultaneously said selected number of unit weights from the lever to return the mechanism to the first capacity for a first weighing cycle and for then returning substantially simultaneously said selected number of unit weights to the lever to return the mechanism to the second capacity for a second weighing cycle, and means for indicating the number of unit weights hung upon the lever.

9. In a weighing scale, in combination, mechanism including a pivotally mounted lever and a plurality of unit weights for offsetting load, selecting means for hanging a selected number of the unit weights on the lever to selectively increase the load offsetting capacity of the mechanism from a first capacity to an increased capacity, lifting means for lifting substantially simultaneously said selected number of unit weights from the lever to return the mechanism to the first capacity for a first weighing cycle and for then returning substantially simultaneously said selected number of unit weights to the lever to return the mechanism to the second capacity for a second weighing cycle, an indicating device, and means for operatively connecting the indicating device either to the selecting means during the time that the selecting means is operated or to the lifting means when the lifting means is operated, whereby the device indicates the amount of load offset by unit weights.

10. In a weighing scale, in combination, mechanism including a pivotally mounted lever and a plurality of unit weights for offsetting load, selecting means including a set of cams for hanging a selected number of the unit weights on the lever to selectively increase the load offsetting capacity of the mechanism from a first capacity to an increased capacity and a pair of cams that moves as one with the set of cams, a jointed follower having a spring, an arm urged by the spring against the periphery of one of said pair of cams and a second arm urged by the spring against the periphery of the other one of said pair of cams, indicating means on the second arm of the jointed follower for indicating the amount of load offset by unit weights, lifting means for lifting cyclically said selected number of unit weights from the lever to return the mechanism to the first capacity for a first weighing cycle and for then returning said selected number of unit weights to the lever to return the mechanism to the second capacity for a second weighing cycle, and a pivotally mounted arm that moves as one with the lifting means, that, when the lifting means lifts unit weights from the lever, drives the second arm of the jointed follower away from the periphery of its cam in opposition to the spring whereby the indicating means indicates that the unit weights have been removed and that, when the lifting means returns unit weights to the lever, permits the spring to return the second arm of the jointed follower to its cam whereby the indicating means again indicates the amount of load offset by unit weights.

11. In a weighing scale, in combination, mechanism including at least one unit weight for offsetting load, first means including a unit weight cam for positioning the unit weight to selectively increase the load offsetting capacity of the mechanism from a first capacity to a second capacity and a pair of cams that moves as one with the unit weight cam, a follower having a return spring, an arm urged by the spring against the periphery of one of said pair of cams and a second arm urged by the spring against the periphery of the other one of said pair of cams, indicating means on the second arm of the follower for indicating the amount of load offset by the unit weight, second means for cyclically repositioning the unit weight to return the mechanism to the first capacity for tare weighing and positioning the unit weight to return the mechanism to the second capacity for gross weighing, and a pivotally mounted arm that moves as one with the second means, that, when the second means repositions the unit weight for tare weighing, drives the second arm of the follower away from the periphery of its cam in opposition to the return spring whereby the indicating means indicates that the unit weight has been repositioned and that, when the second means positions the unit weight for gross weighing, permits the spring to return the second arm of the follower to its cam whereby the indicating means again indicates the amount of load offset by the unit weight.

References Cited in the file of this patent

UNITED STATES PATENTS

| | | |
|---|---|---|
| 1,511,490 | Ashcraft | Oct. 14, 1924 |
| 2,074,005 | Von Pein et al. | Mar. 16, 1937 |
| 2,308,044 | Brown et al. | Jan. 12, 1943 |
| 2,724,585 | Bradley et al. | Nov. 22, 1955 |
| 2,864,605 | Thorsson et al. | Dec. 16, 1958 |